UNITED STATES PATENT OFFICE.

MAYER DAXE, OF NEW YORK, N. Y.

PAINT AND VARNISH REMOVER.

948,814.  Specification of Letters Patent.  Patented Feb. 8, 1910.

No Drawing.  Application filed December 28, 1908. Serial No. 469,559.

*To all whom it may concern:*

Be it known that I, MAYER DAXE, a citizen of the United States, and a resident of the city of New York, borough of Manhattan, in the county and State of New York, have invented a new and Improved Paint and Varnish Remover, of which the following is a full, clear, and exact description.

This invention relates to means for removing paint and varnish from woodwork and the like, and the object of the invention is to produce a preparation which will operate effectively to soften the varnish and paint so as to facilitate its removal as suggested.

More particularly the purpose of the invention is to provide a mixture having an ingredient which will reduce the rapidity of evaporation of the benzol and alcohol which form active agents in softening the paint or varnish.

In practicing the invention I form a mixture containing: 2 gallons benzol, 2 gallons alcohol, 1½ gallons acetone, ¼ pound wax. These ingredients named above are commonly used in preparations for this purpose. In order to prevent rapid evaporation of the benzol and alcohol, I add to the mixture stated above ½ pound of petroleum jelly and ½ pint of kerosene. The petroleum jelly and kerosene are preferably mixed together independently of the other ingredients. I then stir in the wax, benzol, alcohol, and acetone. If it is desired to make the preparation very pasty, this can be done by increasing the proportion of jelly up to 1½ pounds; the other quantities remain the same. The acetone assists the action of the benzol. The benzol is particularly useful on paint, whereas the alcohol is the active agent when the preparation is applied to varnish. The mixture is ready for use as soon as the substances are all thoroughly dissolved. A slight heating assists the dissolution.

A preparation having the ingredients and proportions described above will not chill or evaporate wholly and may be applied in a fluid or paste form as desired. The petroleum jelly operates effectively to prevent the rapid evaporation of the active agents as suggested above. It is a very inexpensive ingredient and the consistency of the preparation can be nicely regulated by means of the kerosene. The petroleum jelly mixes with the kerosene to produce a substance which I consider superior to vaseline which has been used in mixtures of this kind for a similar purpose.

It should be understood that the kerosene being highly fluid acts as an agent when mixed with the jelly to regulate nicely the consistency of the jelly, and also it retards the evaporation of the benzol and alcohol. In other words the kerosene affords means for tempering the petroleum jelly. After applying the preparation the paint or varnish may be removed in about two minutes.

Having thus described my invention, I claim as new and desire to secure by Letters Patent,—

1. A composition of the class described, containing the following ingredients and substantially in the proportions specified, to wit: benzol, 2 gallons; alcohol, 2 gallons; acetone, 1½ gallons; wax, ¼ pound; kerosene, ½ pint; petroleum jelly, ½ to 1½ pounds.

2. A composition for removing paint and varnish, containing benzol, alcohol, acetone, wax, petroleum jelly, and kerosene, said kerosene affording means for rendering the wax soluble, said petroleum jelly maintaining uniformity of the composition and preventing rapid evaporation of said composition.

In testimony whereof I have signed my name to this specification in the presence of two subscribing witnesses.

MAYER DAXE.

Witnesses:
F. D. AMMEN,
EVERARD B. MARSHALL.